United States Patent
Futatsugi

(10) Patent No.: US 9,407,299 B2
(45) Date of Patent: Aug. 2, 2016

(54) RADIO RECEPTION DEVICE AND RADIO RECEPTION METHOD IN RADIO COMMUNICATION SYSTEM

(71) Applicant: NEC Corporation, Tokyo (JP)

(72) Inventor: Yasunori Futatsugi, Tokyo (JP)

(73) Assignee: NEC Corporation, Tokyo (JP)

( * ) Notice: Subject to any disclaimer, the term of this patent is extended or adjusted under 35 U.S.C. 154(b) by 71 days.

(21) Appl. No.: 14/361,415

(22) PCT Filed: Nov. 8, 2012

(86) PCT No.: PCT/JP2012/007161
§ 371 (c)(1),
(2) Date: May 29, 2014

(87) PCT Pub. No.: WO2013/080451
PCT Pub. Date: Jun. 6, 2013

(65) Prior Publication Data
US 2014/0335812 A1    Nov. 13, 2014

(30) Foreign Application Priority Data
Nov. 30, 2011 (JP) .................. 2011-261308

(51) Int. Cl.
*H04B 1/10* (2006.01)
*H04J 11/00* (2006.01)
(Continued)

(52) U.S. Cl.
CPC .......... *H04B 1/1027* (2013.01); *H04J 11/0023* (2013.01); *H04L 25/0202* (2013.01); *H04W 16/14* (2013.01)

(58) Field of Classification Search
CPC .................................................. H04W 16/14
USPC .................................................. 455/307, 296
See application file for complete search history.

(56) References Cited

U.S. PATENT DOCUMENTS

| 7,324,437 | B1 * | 1/2008 | Czylwik | H04L 1/06 370/203 |
| 2009/0190633 | A1 * | 7/2009 | Smith | H04B 1/123 375/148 |
| 2010/0061495 | A1 | 3/2010 | Cho et al. | |

FOREIGN PATENT DOCUMENTS

| EP | 1 903 732 A2 | 3/2008 |
| JP | 2009-081535 | 4/2009 |

(Continued)

OTHER PUBLICATIONS

W. Peng et al., "Frequency Domain Adaptive Antenna Array for Broadband Single-Carrier Uplink Transmission", IEICE Trans. Commun. vol. E94-B, No. 7, Jul. 2011.

(Continued)

*Primary Examiner* — Sanh Phu
(74) *Attorney, Agent, or Firm* — Finnegan, Henderson, Farabow, Garrett & Dunner LLP

(57) ABSTRACT

A radio reception device and a radio receiving method are provided that, when a frequency band assigned to a different radio system is shared, can effectively suppress the influence of interfering waves from this different radio system. A radio reception device is one in a second radio system (11) that can use a frequency band assigned to a first radio system (10), and includes: a desired wave channel estimation section (110) that generates, based on reception signals, first channel estimate values (Es) of interfering wave components arriving from the first radio system, which uses a different communication scheme from that of the second radio system; an interfering wave channel estimation section (120) that generates, based on the reception signals, second channel estimate values (Ei) of desired wave components received through the communication scheme of the second radio system; and an equalization section (105) that suppresses the interfering wave components by using the first and second channel estimate values.

15 Claims, 11 Drawing Sheets

(51) Int. Cl.
*H04L 25/02* (2006.01)
*H04W 16/14* (2009.01)

(56) References Cited

FOREIGN PATENT DOCUMENTS

| WO | WO 2008/090764 A1 | 7/2008 |
| WO | WO 2010/053019 A1 | 5/2010 |
| WO | WO 2010/085890 A1 | 8/2010 |
| WO | WO 2011/126570 A2 | 10/2011 |

OTHER PUBLICATIONS

J. Masuno et al., "Frequency/Utilization Efficiency Improvement by Cyclic FEC Decoding in Superposed Multicarrier Transmission", IEICE Technical Report, RCS2008-132, Nov. 2008.
International Search Report mailed Jan. 15, 2013.
Extended European Search Report mailed on Jul. 3, 2015, by the European Patent Office in counterpart European Patent Application No. 12852594.6.

* cited by examiner

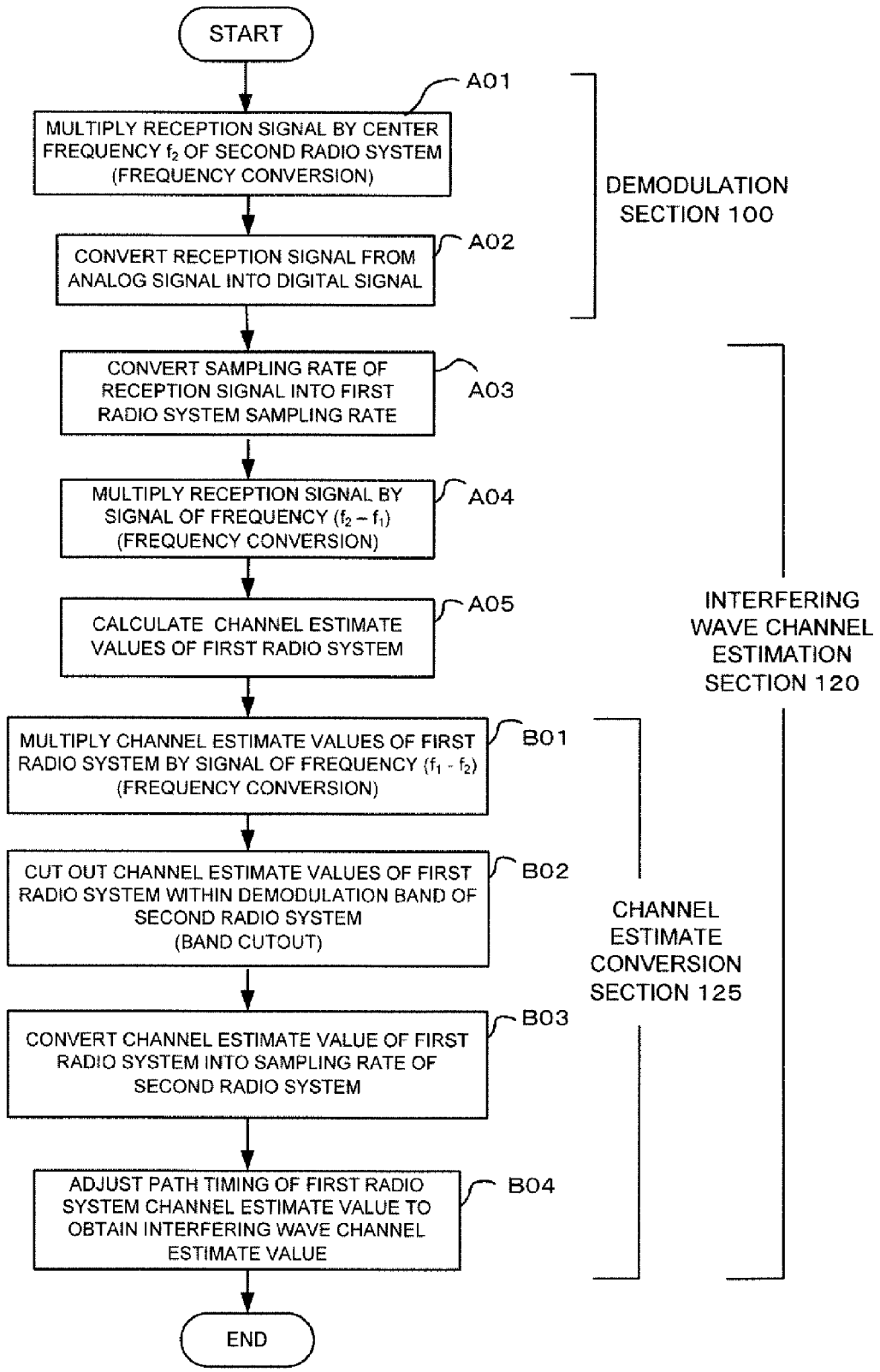

SAMPLING INTERVAL OF CHANNEL ESTIMATE VALUES OF FIRST RADIO SYSTEM

⇩ SAMPLING INTERVAL CONVERSION

SAMPLING INTERVAL OF CHANNEL ESTIMATE VALUES OF SECOND RADIO SYSTEM

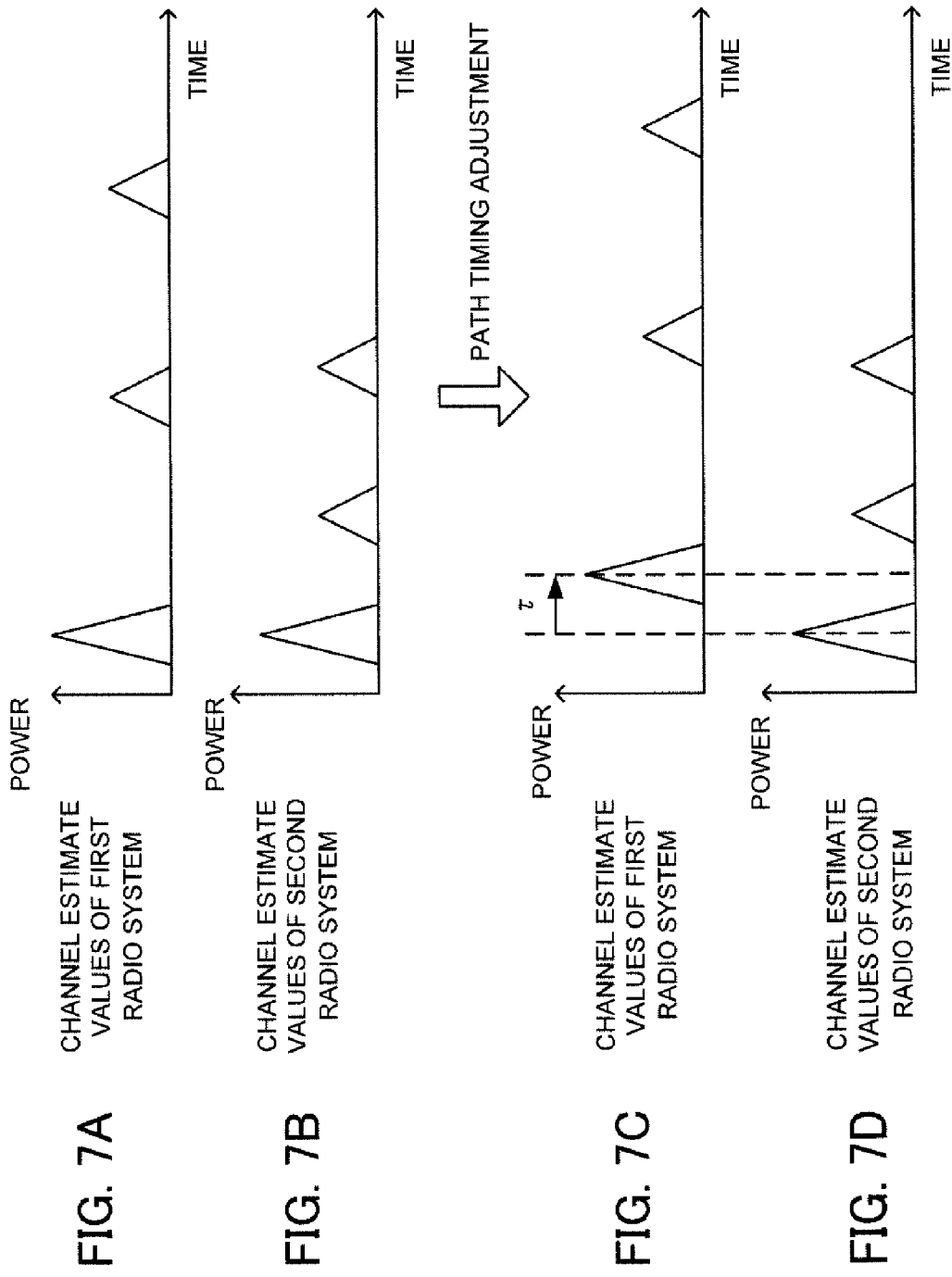

RADIO RECEPTION DEVICE AND RADIO RECEPTION METHOD IN RADIO COMMUNICATION SYSTEM

CROSS-REFERENCE TO RELATED PATENT APPLICATIONS

This application is a National Stage Entry of International Application No. PCT/JP2012/007161, filed Nov. 8, 2012, which claims priority from Japanese Patent Application No. 2011-261308, filed Nov. 30, 2011. The entire contents of the above-referenced applications are expressly incorporated herein by reference.

TECHNICAL FIELD

The present invention relates to a radio communication system and, more particularly, to a radio reception device and a radio receiving method utilizing a frequency band assigned to radio communication systems of different radio schemes.

BACKGROUND ART

In next-generation radio communication systems, there are concerns over exhaustion of frequency resources as the transmission rates increase with wider bandwidths and systems are increasingly diversified. In such circumstances, cognitive radios have been studied that identify surrounding radio wave environments and users' needs to autonomously optimize communication parameters. Dynamic spectrum access, which allows a frequency band assigned to an existing radio communication system to be secondarily used by another radio communication system, has in particular drawn attentions in terms of the efficient use of frequency resources.

Referring to FIG. 1, the dynamic spectrum access is a technology in which a spectrum available in a frequency band that is assigned to a first radio system 10 is used by a new second radio system 11 in such a manner that the second radio system 11 will not interfere with communication in the first radio system 10. FIG. 1 depicts, as an example, a case where an uplink of the second radio system 11 shares a frequency band assigned to a downlink of the first radio system 10. That is, in the first radio system 10, a transmitter 12 sends data to a receiver 13, while in the second radio system 11, a transmitter 14 uses the same frequency band to send data to a receiver 15. In principle, the transmitter 14 of the second radio system performs communication by using, for example, transmission power control so that interference with the receiver 13 of the first radio system 10 will not be higher than a defined value because when a frequency is shared, communication in the second radio system 11 need to be performed in such a manner as not to interfere with communication in the first radio system 10. Thus, it is possible to suppress interference from the second radio system 11 to the first radio system 10.

On the other hand, the receiver 15 of the second radio system 11 receives its own system's desired waves 21 transmitted from the transmitter 14 and, at the same time, receives a signal arriving from the transmitter 12 of the first radio system as interfering waves 20. Accordingly, at the receiver 15 of the second radio system, transmission characteristics deteriorate due to interference arriving from the transmitter 12 of the first radio system. If the transmitter 14 of the second radio system 11 is a mobile station such as a mobile communication terminal and its transmission frequency shares the frequency band of the first radio system 10 in particular, the separation distance between the first radio system 10 and the second radio system 11 is short because the transmission power of the transmitter 14 is small and the antenna height thereof is low, and consequently the interfering waves 20 arriving from the transmitter 12 of the first radio system have a great influence.

Various technologies for suppressing the influence of interfering waves have been proposed. For example, according to a radio receiver with multiple antennas disclosed in NPL 1, the channel estimate values of desired waves 21 and the channel estimate values of interfering waves 20 are determined, and based on them, an equalization weight is generated that minimizes the square error between a pilot code and an equalized signal, thereby suppressing interference. Moreover, PTL 1 also discloses a communication device that suppresses the influence of interfering waves by estimating the channel characteristics of interfering waves and desired waves by using a pilot subcarrier.

CITATION LIST

Patent Literature

[PTL 1]
Japanese Patent Application Unexamined Publication No. 2009-081535

Non-Patent Literature

[NPL 1]
W. Peng and F. Adachi, "Frequency Domain Adaptive Antenna Array for Broadband Single-Carrier Uplink Transmission," IEICE Trans. Commun., Vol. E94-B, No. 7 July 2011

SUMMARY OF INVENTION

Technical Problem

According to FIG. 1, disclosed in the above-mentioned PTL 1 and NPL 1 are interference suppression technologies on the premise that the first radio system 10 and the second radio system 11 use the same communication scheme. For example, in PTL 1, any of the communication schemes used by an interfering station and a desired station is WiMAX.

However, even if the transmitter 12 of the first radio system 10 in FIG. 1 uses a different communication scheme from that of the second radio system 11, the transmitter 12 can be an interfering station with the receiver 15 of the second radio system. For example, in a case where the transmitter 12 of the first radio system 10 is a television broadcast transmitter, waves transmitted from the transmitter 12 can possibly arrive at the receiver 15 of the second radio system 11 as interfering waves 20 even if the receiver 15 is located outside the broadcast area.

Accordingly, the interference suppression technique disclosed in PTL 1 or NPL 1 cannot effectively suppress interference between different radio systems that a transmitter of one of the radio systems inflicts on a receiver of the other radio system.

The present invention is made to solve problems as described above, and an object thereof is to provide a radio reception device and a radio reception method that can effectively suppress the influence of interfering waves from a different radio system when a frequency band of the different radio system is shared.

Solution to Problem

A radio reception device according to the present invention is a radio reception device that can use a frequency band assigned to a first radio system in a second radio system, characterized by comprising: first estimation means that generates, based on reception signals, first channel estimate values of interfering wave components arriving from the first radio system, which uses a different communication scheme from that of the second radio system; second estimation means that generates, based on the reception signals, second channel estimate values of desired wave components received through the communication scheme of the second radio system; and interference suppression means that suppresses the interfering wave components by using the first and second channel estimate values.

A radio receiving method according to the present invention is a radio receiving method for a radio reception device that can use a frequency band assigned to a first radio system in a second radio system, characterized by comprising: generating, based on reception signals, first channel estimate values of interfering wave components arriving from the first radio system, which uses a different communication scheme from that of the second radio system; generating, based on the reception signals, second channel estimate values of desired wave components received through the communication scheme of the second radio system; and suppressing the interfering wave components by using the first and second channel estimate values.

A mobile station according to the present invention is a mobile station that can use a frequency band assigned to a first radio system in a second radio system, characterized by comprising: first estimation means that generates, based on reception signals, first channel estimate values of interfering wave components arriving from the first radio system, which uses a different communication scheme from that of the second radio system; second estimation means that generates, based on the reception signals, second channel estimate values of desired wave components received through the communication scheme of the second radio system; and interference suppression means that suppresses the interfering wave components by using the first and second channel estimate values.

A communication system according to the present invention is a communication system including a radio communication device that can use a frequency band assigned to a first radio system in a second radio system, characterized in that the radio communication device generates, based on reception signals, first channel estimate values of interfering wave components arriving from the first radio system, which uses a different communication scheme from that of the second radio system, and second channel estimate values of desired wave components received through the communication scheme of the second radio system, and suppresses the interfering wave components by using the first and second channel estimate values.

Advantageous Effects of Invention

According to the present invention, it is possible to effectively suppress the influence of interfering waves from a different radio system and to enhance interference suppression performance.

BRIEF DESCRIPTION OF DRAWINGS

FIG. 4 is a flowchart to describe operations of a first channel estimation section shown in FIG. 2.

FIGS. 7A to 7D are waveform diagrams of channel estimate values to describe operations of a path timing adjustment section shown in FIG. 3.

DESCRIPTION OF EMBODIMENTS

According to exemplary embodiments of the present invention, a radio reception device, which operates in a radio system of a certain communication scheme, performs channel estimation of interfering waves from another radio system of a different communication scheme, thereby suppressing the influence of interfering waves from the another radio system when sharing a frequency band that is assigned to the another radio system. Thus, it is possible to improve the effective signal-to-interference-plus-noise power ratio of the radio reception device and to increase throughput.

1. First Exemplary Embodiment

Hereinafter, a first exemplary embodiment of the present invention will be described in detail with reference to drawings. Single-carrier and multi-carrier transmission systems will be illustrated as an example of radio access schemes, and it will be assumed that the radio reception device of the second radio system 11 in FIG. 1 shares a frequency band assigned to the first radio system 10. The first radio system 10 and the second radio system 11 in FIG. 1 have different communication parameters, and here demodulation parameters (center frequency, sampling rate, and system bandwidth) are assumed to be different. Note that the radio reception device of the second radio system 11 is also applicable to a reception section of any of a mobile station and a base station in the second radio system 11 in FIG. 1.

1.1) Configuration

Figure 2:
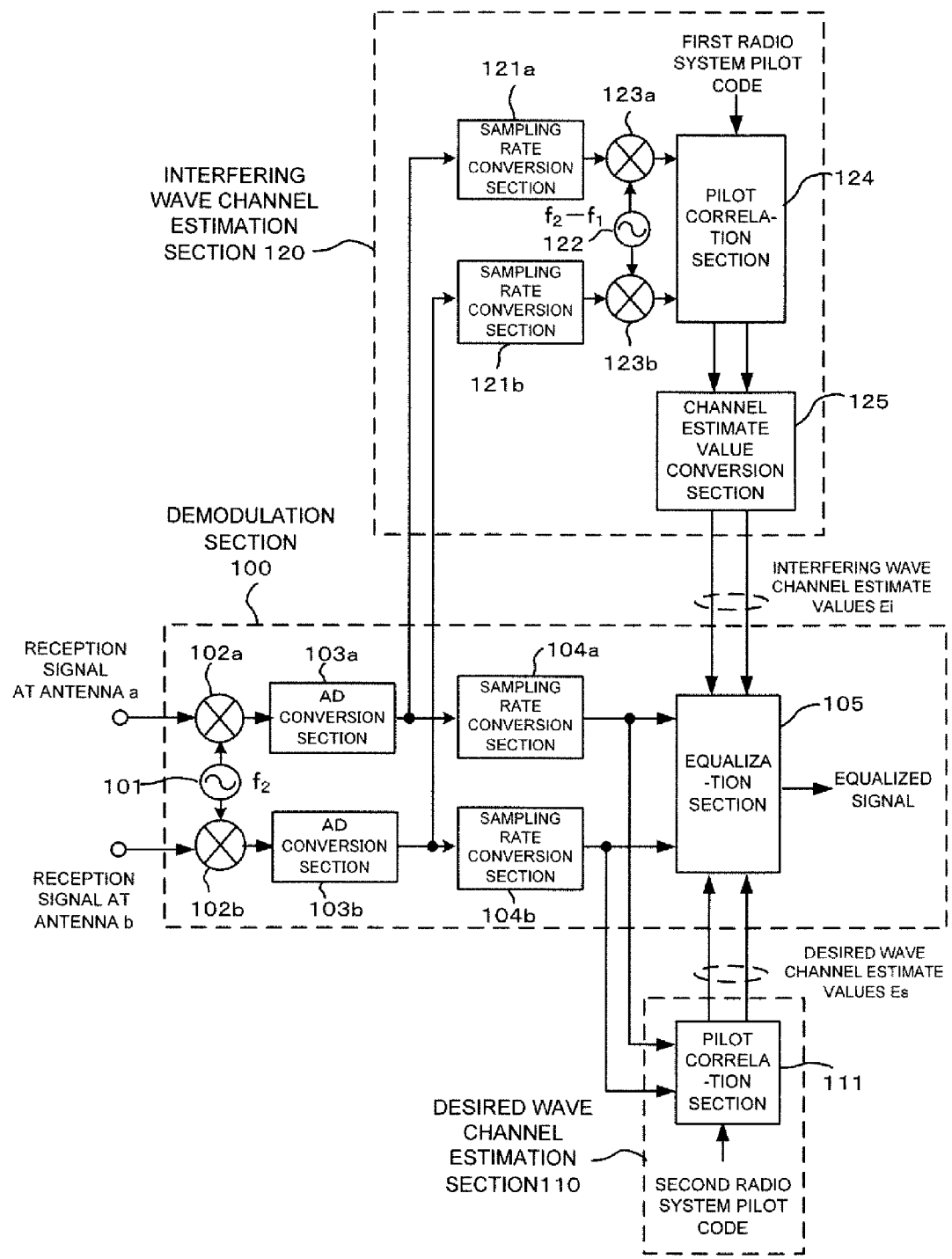
FIG. 2 is a block diagram showing a functional configuration of a radio reception device according to a first exemplary embodiment of the present invention.

Referring to FIG. 2, the radio reception device according to the first exemplary embodiment of the present invention includes a plurality of antennas (here, two receiving antennas a and b), a demodulation section 100, a desired wave channel estimation section 110, and an interfering wave channel estimation section 120. The demodulation section 100 receives as input desired wave channel estimate values Es, which are obtained by the desired wave channel estimation section 110, and interfering wave channel estimate values Ei, which are obtained by the interfering wave channel estimation section 120, and generates a reception signal in which interference components are suppressed.

The demodulation section 100 includes a frequency oscillator 101 that generates an oscillation signal of a frequency $f_2$, frequency conversion sections 102a and 102b, AD (Analog-to-Digital) conversion sections 103a and 103b, sampling rate conversion sections 104a and 104b, and an equalization section 105.

The desired wave channel estimation section 110 includes a pilot correlation section 111 and generates the desired wave channel estimate values Es based on a correlation between digital reception signals output from the sampling rate conversion sections 104a and 104b, respectively, and a pilot code of the second radio system to which this radio reception device belongs.

The interfering wave channel estimation section 120 includes sampling rate conversion sections 121a and 121b, a frequency oscillator 122, frequency conversion sections 123a and 123b, a pilot correlation section 124, and a channel estimate value conversion section 125. The sampling rate conversion sections 121a and 121b receive as input digital reception signals from the AD conversion sections 103a and 103b of the demodulation section 100, respectively.

Figure 3:
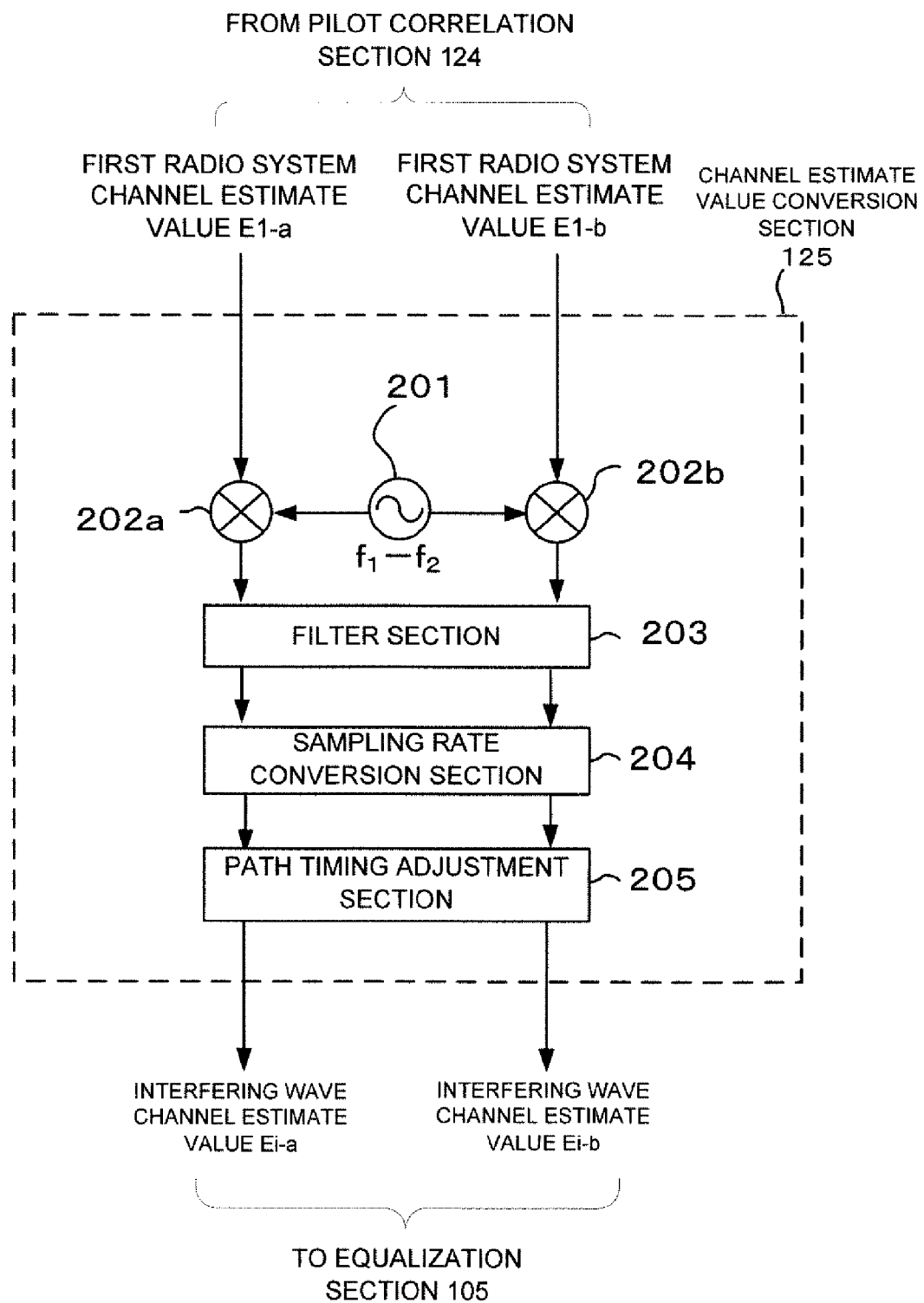
FIG. 3 is a block diagram showing a more detailed functional configuration of a channel estimate value conversion section of the radio reception device shown in FIG. 2.

Referring to FIG. 3, the channel estimate value conversion section 125 includes a frequency oscillator 201, frequency conversion sections 202a and 202b, a filter section 203, a sampling rate conversion section 204, and a path timing adjustment section 205.

The pilot correlation section 124 generates interfering wave channel estimate values based on a correlation between digital reception signals output from the frequency conversion sections 123a and 123b, respectively, and a pilot code of the first radio system, and the channel estimate value conversion section 125 converts these values so that they will conform with the second radio system, thereby generating the interfering wave channel estimate values Ei, which will be described in more detail later.

Note that the demodulation section 100, the desired wave channel estimation section 110, and the interfering wave channel estimation section 120 are shown as individual functional blocks in FIG. 2, but they are not limited to such configurations. For example, it is also possible to configure the sampling rate conversion sections 104a, 104b and the equalization section 105 of the demodulation section 100, the desired wave channel estimation section 110, and the interfering wave channel estimation section 120 into a single circuit chip.

Alternatively, it is also possible to implement functions equivalent to the functions implemented by the sampling rate conversion sections 104a, 104b and the equalization section 105 of the demodulation section 100, the desired wave channel estimation section 110, and the interfering wave channel estimation section 120 by executing programs stored in a memory on a program-controlled processor such as a CPU (Central Processing Unit).

1.2) Operation

Operations of the radio reception device shown in FIG. 2 will be described, partially with reference to FIG. 4.

First, the frequency oscillator 101 generates a frequency signal whose frequency is the center frequency $f_2$ of receive signals of the second radio system and outputs it to each of the frequency conversion sections 102a and 102b. The frequency conversion sections 102a and 102b each receive as input the frequency signal of the frequency $f_2$ and RF (Radio-Frequency) reception signals received through the receive antennas a and b, respectively, and convert the respective RF reception signals into baseband signals (Operation A01). The baseband signals thus obtained are output to the AD conversion sections 103a and 103b, respectively, and converted into digital signals (Operation A02). These digital signals are output to the sampling rate conversion sections 104a and 104b, respectively, and also to the sampling rate conversion sections 121a and 121b of the interfering wave channel estimation section 120, respectively.

In the demodulation section 100, the sampling rate conversion sections 104a and 104b convert the sampling rate of the digital reception signals, which are input from the AD conversion sections 103a and 103b, respectively, into a predetermined sampling rate suitable for demodulation in the second radio system. The digital signals of the predetermined sampling rate are output to each of the pilot correlation section 111 and the equalization section 105.

The pilot correlation section 111 performs correlation processing of the digital reception signals of the predetermined sampling rate with a predetermined pilot code of the second radio system and obtains the channel estimate values of desired waves transmitted from a transmitter of the second radio system. The desired wave channel estimate values Es thus obtained are output to the equalization section 105.

In the interfering wave channel estimation section 120, the sampling rate conversion sections 121a and 121b receive as input the digital signals, which are output from the AD conversion sections 103a and 103b, respectively, and convert the sampling rate of the input digital signals into a predetermined sampling rate suitable for demodulation in the first radio system (Operation A03). The sampling rate conversion sections 121a and 121b output the signals of the predetermined sampling rate to the frequency conversion sections 123a and 123b, respectively.

The frequency oscillator 122 generates a frequency signal of a frequency $(f_2-f_1)$, which is equivalent to the difference between the center frequency $f_2$ of second radio system receive signals and the center frequency $f_1$ of first radio system receive signals, and outputs it to each of the frequency conversion sections 123a and 123b. The frequency conversion sections 123a and 123b receive as input the baseband reception signals of the converted sampling rate, which are input from the sampling rate conversion sections 121a and 121b, respectively, and multiply them by the frequency signal of the frequency $(f_2-f_1)$, thereby performing frequency conversion so that the center frequency of the first radio system receive signals will be 0, which will be described later (Operation A04). The frequency conversion sections 123a and 123b output the frequency-converted first radio system reception signals to the pilot correlation section 124.

The pilot correlation section 124 receives as input the frequency-converted reception signals from the frequency conversion sections 123a and 123b, respectively, and performs correlation processing of them with a predetermined pilot code of the first radio system, thereby obtaining channel estimate values with respect to the first radio system (Operation A05). The pilot correlation section 124 outputs these first radio system channel estimate values to the channel estimate value conversion section 125.

The channel estimate value conversion section 125 receives as input the first radio system channel estimate values, which are output from the pilot correlation section 124, and converts, for example, the center frequency and the sampling rate thereof so that they will conform with the demodulation parameters of the second radio system. The channel estimate value conversion section 125 outputs the thus obtained interfering wave channel estimate values Ei whose demodulation parameters have been converted into those of the second radio system, to the equalization section 105 (Operations B01 to B04, which will be described in more detail later).

The equalization section 105 receives as input the interfering wave channel estimate values Ei and the desired wave channel estimate values Es from the channel estimate value conversion section 125 and the pilot correlation section 111, respectively, and generates an equalization weight that minimizes the square error between the pilot code of the second radio system and an equalized signal, based on, for example, the MMSE (Minimum Mean Square Error) criterion. The equalization section 105 then performs equalization processing of the reception signals input from the sampling rate conversion sections 104a and 104b by using the equalization weight and outputs an equalized signal.

1.3) Channel Estimate Value Conversion

Since the first radio system 10 and the second radio system 11 have different demodulation parameters (center frequency, sampling rate, and system bandwidth) as described above, channel estimate value conversion processing is needed for matching the channel estimate values of waves received from the first radio system, which are obtained by the pilot correlation section 124, with the demodulation parameters of the second radio system. Hereinafter, operations of the channel estimate value conversion section 125 will be described.

The frequency oscillator 201 of the channel estimate value conversion section 125 generates a frequency signal of a frequency $(f_1-f_2)$, which is equivalent to the difference between the center frequency $f_1$ of first radio system reception signals and the center frequency $f_2$ of second radio system reception signals and outputs it to the frequency conversion sections 202a and 202b.

The frequency conversion sections 202a and 202b multiply first radio system channel estimate values E1-a and E1-b, which are input from the pilot correlation section 124, by the frequency signal of the frequency $(f_1-f_2)$, respectively, thereby converting the frequency of the first radio system channel estimate values E1-a and E1-b back into the frequency before frequency conversion performed by the frequency conversion section 123a and 123b (Operation B01 in FIG. 4). The frequency conversion sections 202a and 202b output the frequency-converted first radio system channel estimate values to the filter section 203.

The filter section 203 performs processing for cutting out the frequency-converted first radio system channel estimate values within a demodulation bandwidth of the second radio system (Operation B02) and outputs the cut-out first radio system channel estimate values to the sampling rate conversion section 204.

The sampling rate conversion section 204 converts the sampling intervals of the cut-out first radio system channel estimate values from that of the first radio system into that of the second radio system (Operation B03). For example, interpolation processing is used for the conversion of the sampling intervals, which will be described later. The sampling rate conversion section 204 outputs the sampling-converted first radio system channel estimate values to the path timing adjustment section 205.

The path timing adjustment section 205 delay-shifts the first radio system channel estimate values of the converted sampling intervals by a period of time equivalent to a path timing difference τ between propagation paths in the first and second radio systems, and outputs the first radio system channel estimate values of the adjusted path timing, as the interfering wave channel estimate values Ei-a and Ei-b, to the equalization section 105 (Operation B04). Hereinafter, principal operations in the present exemplary embodiment will be described in detail.

1.4) Frequency Conversion and Band Cutout Processing

Figure 5A:
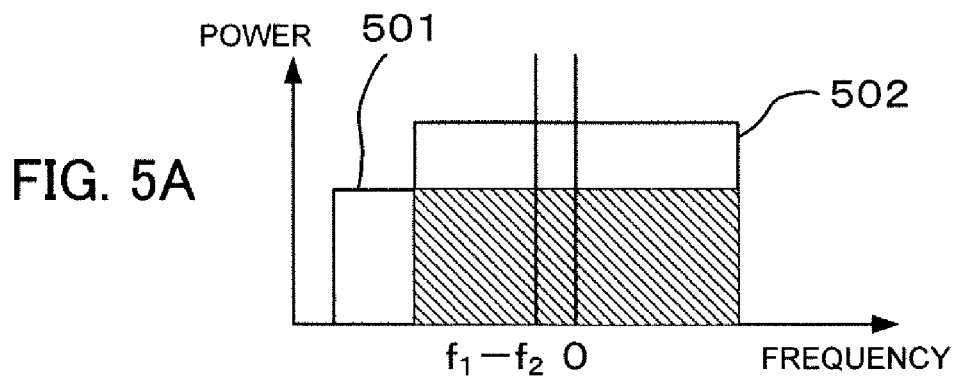
FIGS. 5A to 5D are schematic spectrum diagrams to describe frequency conversion and band extraction processing at the radio reception device shown in FIG. 2.

FIG. 5A shows the spectra of reception signals output from the frequency conversion sections 102a and 102b of the demodulation section 100, where the horizontal axis represents frequency and the vertical axis represents power. The center frequency of a reception signal spectrum 502 of the second radio system is placed at 0, while the center frequency of a reception signal spectrum 501 of the first radio system is placed at $(f_1-f_2)$. Diagonally shaded is an overlap frequency area of the reception signal spectrum 502 of the second radio system and the reception signal spectrum 501 of the first radio system.

Figure 5B:
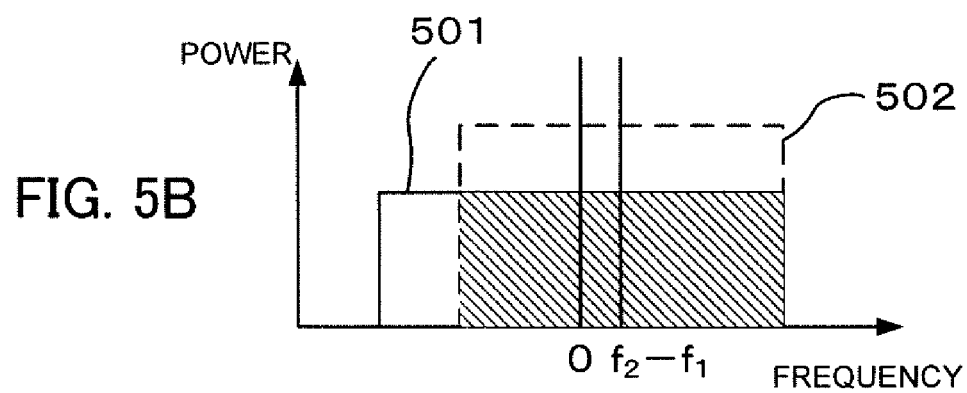

FIG. 5B shows the spectra of reception signals output from the frequency conversion sections 123a and 123b of the interfering wave channel estimation section 120. The reception signal spectrum 501 of the first radio system is placed through frequency conversion processing by the frequency conversion sections 123a and 123b so that the center frequency thereof will be 0. The reason for placing the center frequency of the reception signal spectrum 501 of the first radio system at 0 is that the pilot correlation section 124 at the subsequent stage performs pilot correlation processing.

Figure 5C:
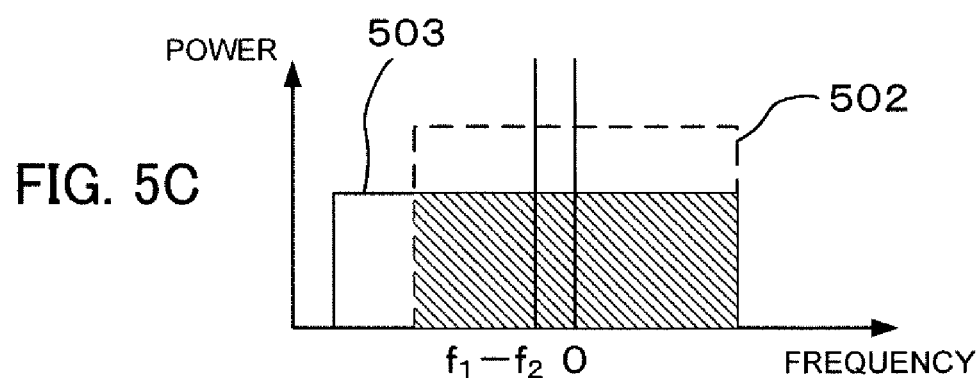

FIG. 5C shows first radio system channel estimate values 503 output from the frequency conversion sections 202a and 202b of the channel estimate value conversion section 125. The center frequency of the first radio system channel estimate values 503 is placed at $(f_1-f_2)$. This processing is performed so as to convert the frequency of the first radio system channel estimate values back into that observed in the second radio system by reversely performing the steps of the frequency conversion processing by the frequency conversion sections 123a and 123b.

Figure 5D:
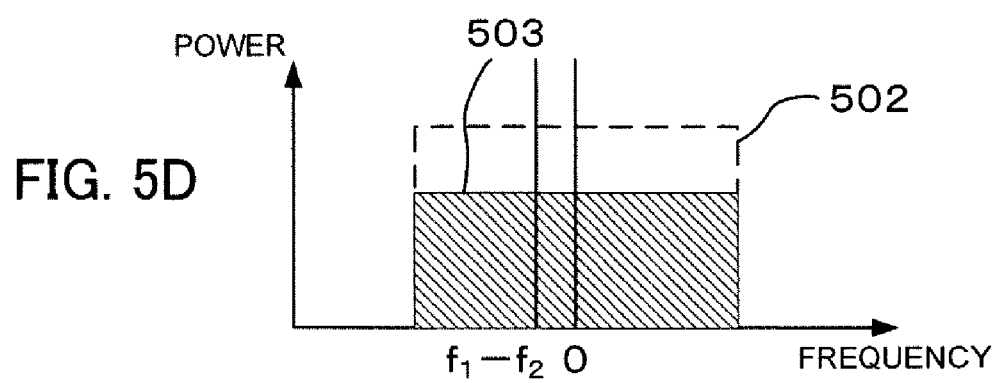

FIG. 5D shows first radio system channel estimate values output from the filter section 203 of the channel estimate value conversion section 125. Of the first radio system channel estimate values 503, only channel estimate values within the range of frequencies that overlap with the demodulation band 502 of the second radio system are cut out to output.

1.5) Sampling Rate Conversion

Figure 6A:
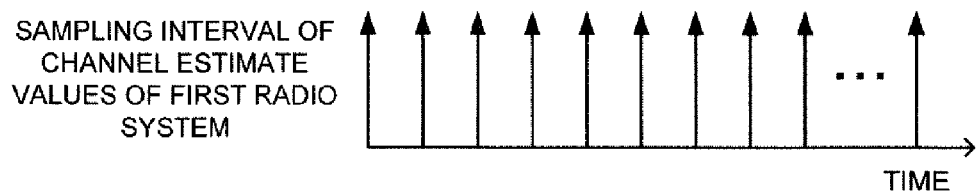
FIGS. 6A and 6B are diagrams showing sampling intervals to describe operations of a sampling rate conversion section shown in FIG. 3.
Figure 6B:
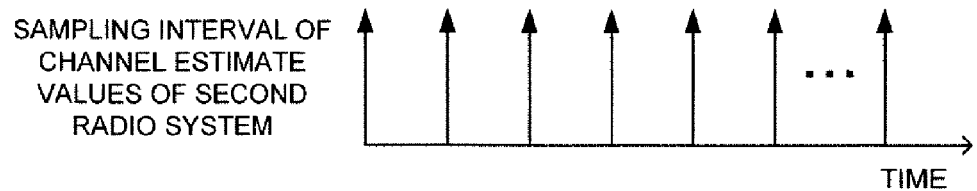

FIG. 6 are diagrams schematically showing processing by the sampling rate conversion section 204 of the channel estimate value conversion section 125, in which the horizontal axes represent time. FIG. 6A shows the sampling intervals of the first radio system channel estimate values, and FIG. 6B shows the sampling intervals of the second radio system channel estimate values. The sampling rate conversion section 204 matches the sampling intervals of the first radio system channel estimate values with the sampling intervals of the second radio system channel estimate values by, for example, interpolation processing.

1.6) Path Timing Adjustment

FIG. 7 are diagrams schematically showing an example of operations of the path timing adjustment section 205 of the channel estimate value conversion section 125, in which the horizontal axes represent time and the vertical axes represent power. FIG. 7A shows the first radio system channel estimate values before path timing adjustment, FIG. 7B, the second radio system channel estimate values before path timing adjustment, FIG. 7C, the first radio system channel estimate values after path timing adjustment, and FIG. 7D, the second radio system channel estimate values after path timing adjustment.

The first and second radio systems operate independently of each other in synchronization with signals arriving at the respective systems. However, in an actual propagation path environment, the delay times of propagation paths in the first and second radio systems do not match with each other. Therefore, the difference between the delay times of propagation paths needs to be reflected on the first radio system channel estimate values. The path timing adjustment section 205 delay-shifts the first radio system channel estimate values, based on a path timing difference r between propagation paths in the first and second radio systems. The first radio system channel estimate values of the thus adjusted path timing are output to the equalization section 105 as the interfering wave channel estimate values Ei-a and Ei-b that can be used in the second radio system. The equalization section 105, as described above, performs equalization processing of the reception signals input from the sampling rate conversion sections 104a and 104b by using the interfering wave channel estimate values Ei-a and Ei-b, to output an equalized signal.

1.7) Effects

As described above, according to the first exemplary embodiment of the present invention, even if the demodulation parameters of the first and second radio systems are different from each other, the first radio system channel estimate values, which are of interfering waves, can be used in the second radio system, and interfering waves arriving from the first radio system can be suppressed with high precision by multiple-antenna spatial filtering. Thereby, it is possible to improve the effective signal-to-interference-plus-noise power ratio of the second radio system and to increase throughput. Moreover, since the influence of interfering waves arriving from the first radio system is reduced, it is possible to shorten the separation distance between a transmitter of the first radio system and a receiver of the second radio system and to enlarge the coverage of the second radio system in the shared frequency band.

Incidentally, according to the receivers disclosed in the PTL 1 and NPL 1, desired wave and interfering wave channel estimate values can be obtained if the first and second radio systems use same demodulation parameters. However, if the first and second radio systems use different demodulation parameters, the channel estimate values of interfering waves arriving from the first radio system cannot be obtained in the second radio system. Therefore, according to the receiver disclosed in NPL1, an equalization weight in consideration of interfering waves cannot be generated, and so the effect of suppressing interfering waves cannot be obtained.

2. Second Exemplary Embodiment

Hereinafter, a second exemplary embodiment of the present invention will be described in detail with reference to drawings. However, it is assumed that the radio reception device of the second radio system in FIG. 1 shares a frequency band assigned to the first radio system 10. The radio reception device according to the second exemplary embodiment of the present invention obtains channel estimates and performs equalization processing through processing in frequency domain, assuming an OFDM (Orthogonal Frequency Division Multiplexing) based transmission scheme. The first radio system 10 and the second radio system 11 in FIG. 1 have different communication parameters, and here demodulation parameters (center frequency, subcarrier intervals, and system bandwidth) are assumed to be different. Note that the radio reception device of the second radio system 11 is also applicable to a reception section of any of a mobile station and a base station in the second radio system 11 in FIG. 1.

2.1) Configuration

Figure 8:
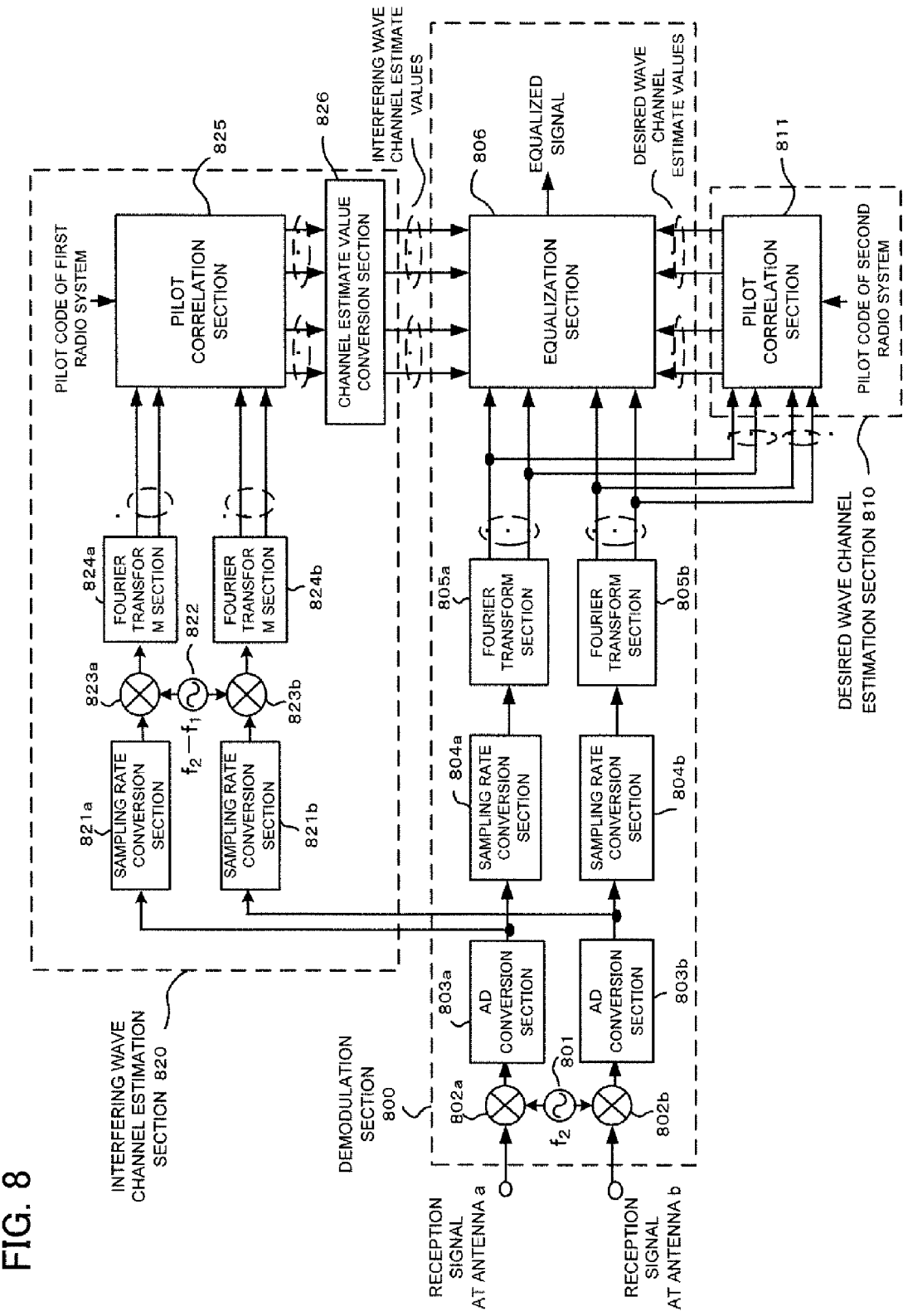
FIG. 8 is a block diagram showing a functional configuration of a radio reception device according to a second exemplary embodiment of the present invention.

Referring to FIG. 8, the radio reception device according to the present exemplary embodiment includes a demodulation section 800 for the second radio system, a desired wave channel estimation section 810, and an interfering wave channel estimation section 820. The demodulation section 800 includes a frequency oscillator 801, frequency conversion sections 802a and 802b, AD conversion sections 803a and 803b, sampling rate conversion sections 804a and 804b, Fourier transform sections 805a and 805b, and an equalization section 806. The desired wave channel estimation section 810 includes a pilot correlation section 811 for the second radio system.

The interfering wave channel estimation section 820 includes sampling rate conversion sections 821a and 821b, a frequency oscillator 822, frequency conversion sections 823a and 823b, Fourier transform sections 824a and 824b, a pilot correlation section 825 for the first radio system, and a channel estimate value conversion section 826 for the first radio system.

Figure 9:
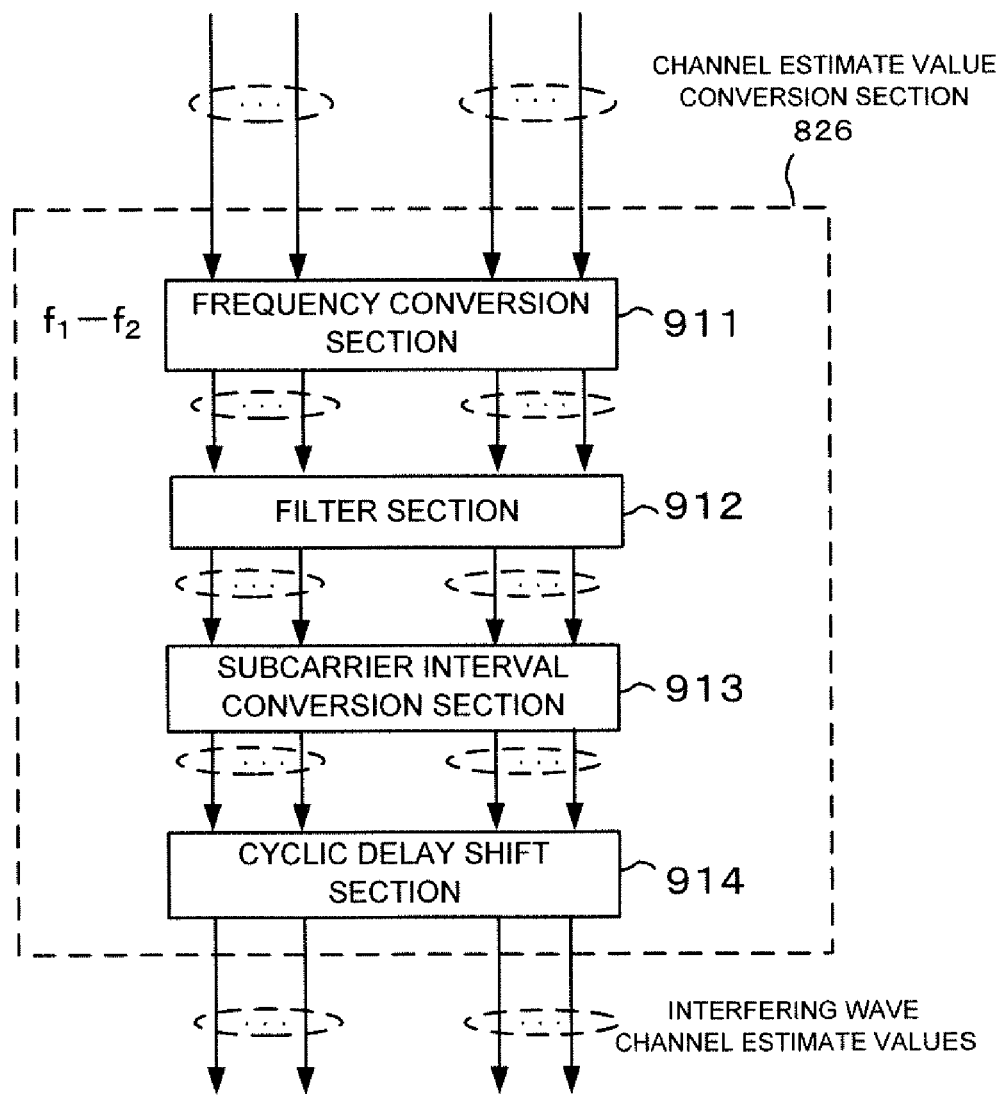
FIG. 9 is a block diagram showing a more detailed functional configuration of a channel estimate value conversion section of the radio reception device shown in FIG. 8.

Referring to FIG. 9, the channel estimate value conversion section 826 includes a frequency conversion section 911, a filter section 912, a subcarrier interval conversion section 913, and a cyclic delay shift section 914.

2.2) Operation

Hereinafter, operations of the radio reception device according to the present exemplary embodiment will be described with reference to FIGS. 8 and 9.

The frequency oscillator 801 generates a frequency signal of a frequency $f_2$ that corresponds to the center frequency of reception signals of the second radio system, and outputs the generated frequency signal to the frequency conversion sections 802a and 802b. The frequency conversion sections 802a and 802b multiply RF signals, which are received through antennas a and b, respectively, by the frequency signal of the frequency $f_2$, thereby convert them into baseband reception signals, and output the respective baseband signals to the AD conversion sections 803a and 803b, respectively. The baseband reception signals are converted from analog signals into digital signals by the AD conversion section 803a and 803b, respectively, and output to the sampling rate conversion sections 804a and 804b, respectively, and also to the sampling rate conversion sections 821a and 821b of the interfering wave channel estimation section 820, respectively.

The sampling rate conversion sections 804a and 804b convert the sampling rate of the input digital signals into a predetermined sampling rate suitable for demodulation in the second radio system and output them to the Fourier transform sections 805a and 805b, respectively. The Fourier transform sections 805a and 805b convert the reception signals of the converted sampling rate from time-domain signals into frequency-domain signals. Here, for example, FFT (Fast Fourier Transform) or DFT (Discrete Fourier Transform) is used for the Fourier transform processing. The Fourier transform sections 805a and 805b output the frequency-domain reception signals to each of the equation section 806 and the pilot correlation section 811. The pilot correlation section 811 performs correlation processing of the frequency-domain reception signals with a predetermined pilot code of the second radio system to obtain the channel estimate values of desired waves received from a transmitter of the second radio system, and outputs them to the equalization section 806. A desired wave channel estimate value vector $H_0(k)$ of a subcarrier k (k=0, 1, ..., K−1, where K is an integer not smaller than one and is the number of points of the Fourier transform sections 805a and 805b) is represented by the following expression:

$$H_0(k) = R_{pich}(k) \frac{C_0(k)^*}{|C_0(k)|^2} \qquad \text{[Math. 1]}$$

Here, $R_{pich}(k)$ is a reception signal vector in a pilot block, $C_0(k)$ is a frequency-domain pilot code of the second radio system, and a superscript * indicates a complex conjugate. In general, a CAZAC (Constant Amplitude Zero Auto Correlation) code, which causes no noise enhancement in correlation processing, is used for the pilot code.

On the other hand, the sampling rate conversion sections 821a and 821b of the interfering wave channel estimation section 820 convert the sampling rate of the input digital signals into a predetermined sampling rate suitable for demodulation in the first radio system and output them to the frequency conversion sections 823a and 823b, respectively. The frequency oscillator 822 generates a frequency signal of a frequency ($f_2-f_1$), which is equivalent to the difference between the center frequency $f_2$ of reception signals of the second radio system and the center frequency $f_1$ of reception signals of the first radio system, and outputs it to each of the frequency conversion sections 823a and 823b. The frequency conversion sections 823a and 823b multiply the baseband reception signals of the converted sampling rate by the frequency signal of the frequency ($f_2-f_1$), thereby convert the frequency thereof so that the center frequency of the first radio system reception signals will be 0, and then output them to the Fourier transform sections 824a and 824b, respectively. The Fourier transform sections 824a and 824b convert the frequency-converted reception signals from time-domain signals into frequency-domain signals and output the respective frequency-domain signals to the pilot correlation section 825.

The pilot correlation section 825 performs correlation processing of the frequency-domain reception signals with a predetermined pilot code of the first radio system to obtain the channel estimate values of the radio signals received from the first radio system, and outputs them to the channel estimate value conversion section 826. A channel estimate value $H_u(\hat{k})$ of a subcarrier $\hat{k}$ (=0, 1, . . . , $\hat{K}$−1, where $\hat{K}$ is an integer not smaller than one and is the number of points of the Fourier transform sections 824a and 824b) for a transmitter u (u=1, 2, . . . , U, where U is an integer not smaller than one) of the first radio system is represented by the following expression (k with a caret in the expression is represented by $\hat{k}$):

$$H_u(\hat{k}) = R_{pich}(\hat{k}) \frac{C_u(\hat{k})^*}{|C_u(\hat{k})|^2} \qquad \text{[Math. 2]}$$

Here, $R_{pich}(\hat{k})$ is a reception signal vector in a pilot block, and $C_u(\hat{k})$ is a frequency-domain pilot code at a transmitter u of the first radio system. Note that u=0 indicates a transmitter of the second radio system (desired waves), while u>0 indicates a transmitter of the first radio system (interfering waves).

The channel estimate value conversion section 826 receives as input the channel estimate values $H_u(\hat{k})$ and converts, for example, the center frequency and the sampling rate thereof so that they will conform with the demodulation parameters of the second radio system, and outputs interfering wave channel estimate values thus obtained to the equalization section 806. Operations of the channel estimate value conversion section 826 will be described later.

The equalization section 806 generates a frequency-domain equalization weight based on, for example, the MMSE criterion by using the desired wave channel estimate values, which are input from the pilot correlation section 811, and the interfering wave channel estimate values, which are input from the channel estimate value conversion section 826. The equalization section 806 uses the equalization weight to perform equalization processing of the frequency-domain reception signals input from the Fourier transform sections 805a and 805b, and then outputs an equalized signal. An equalization weight vector W(k) of a subcarrier k (k=0, 1, . . . , K−1, where K is an integer not smaller than one and is the number of points of the Fourier conversion sections) is represented by the following expression:

$$W(k) = H_0^H(k) \left[ \sum_{u=0}^{U} H_u(k) H_u^H(k) + \sigma^2 I \right]^{-1} \qquad \text{[Math. 3]}$$

Here, $\sigma^2$ is noise power, I is an identity matrix, and a superscript H indicates a Hermitian conjugate.

2.3) Channel Estimate Value Conversion

As described above, since the first radio system 10 and the second radio system 11 have different demodulation parameters (center frequency, subcarrier intervals, and system bandwidth), channel estimate value conversion processing is needed for matching the channel estimate values of waves received from the first radio system, which are obtained by the pilot correlation section 825, with the demodulation parameters of the second radio system. Hereinafter, operations of the channel estimate value conversion section 826 will be described.

Referring to FIG. 9, the frequency conversion section 911 receives as input the first radio system channel estimate values $H_u(\hat{k})$ from the pilot correlation section 825, converts the frequencies of the channel estimate values $H_u(\hat{k})$ back into the frequencies before frequency conversion performed by the frequency conversion sections 823 through processing in frequency domain, and outputs them to the filter section 912.

The filter section 912 performs processing for cutting out the frequency-converted first radio system channel estimate values within a demodulation bandwidth of the second radio system, and outputs the thus cut-out channel estimate values to the subcarrier interval conversion section 913.

The subcarrier interval conversion section 913 converts the subcarrier intervals of the cut-out first radio system channel estimate values in frequency domain from that of the first radio system to that of the second radio system, and outputs the converted first radio system channel estimate values to the cyclic delay shift section 914. For example, interpolation processing is used for the conversion.

The cyclic delay shift section 914 delay-shifts the first radio system channel estimate values of the converted subcarrier intervals in frequency domain by a period of time equivalent to a path timing difference τ between propagation paths in the first and second radio systems, and outputs the delay-shifted first radio system channel estimate values to the equalization section 806 as interfering wave channel estimate values.

2.4) Subcarrier Interval Conversion

Figure 10:
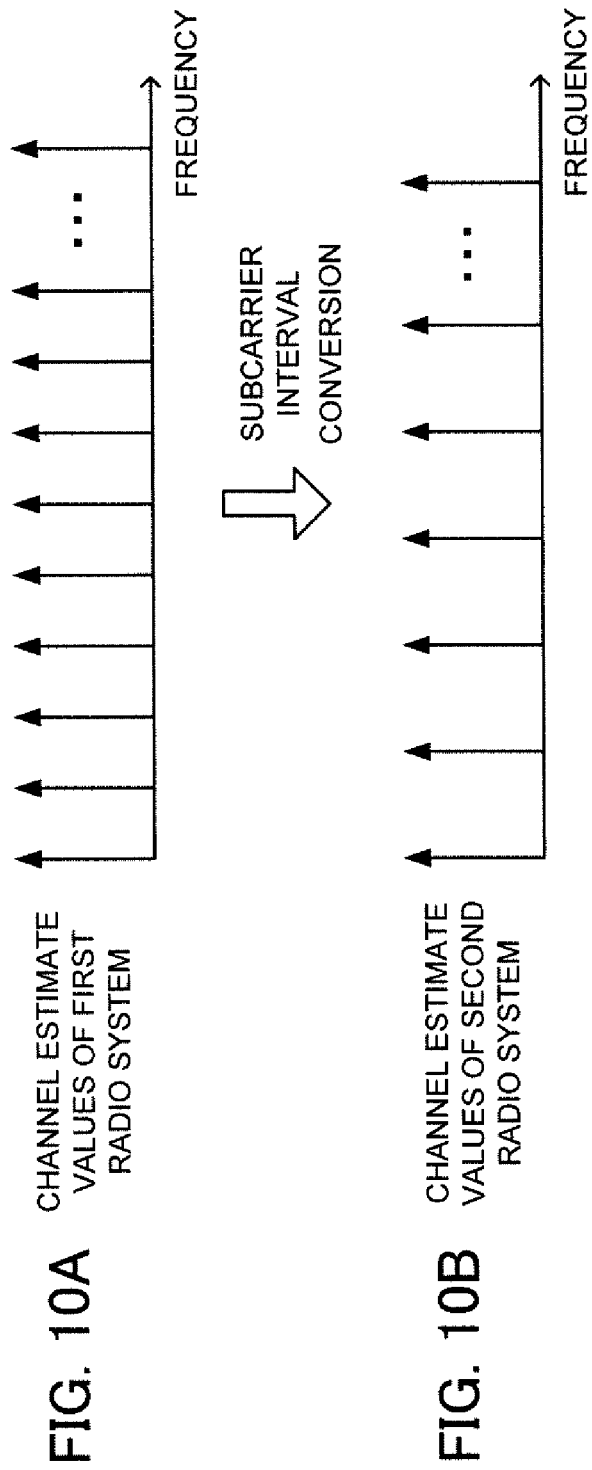
FIGS. 10A and 10B are diagrams showing subcarrier intervals to describe operations of a subcarrier interval conversion section shown in FIG. 9.

FIG. 10 are diagrams showing processing by the subcarrier interval conversion section 913, in which the horizontal axes represent time. FIG. 10A depicts the subcarrier intervals of the first radio system channel estimate values, and FIG. 10B depicts the subcarrier intervals of the second radio system channel estimate values. The subcarrier interval conversion section 913 matches the subcarrier intervals of the first radio system channel estimate values with the subcarrier intervals of the second radio system channel estimate values through, for example, interpolation processing.

2.5) Effects

As described above, according to the second exemplary embodiment of the present invention, even when the first and second radio systems have different demodulation parameters, the first radio system channel estimate values, which are of interfering waves, can be used in the second radio system through processing in frequency domain, so that it is possible to suppress with high precision interfering waves arriving from the first radio system through multiple-antenna spatial filtering. Thereby, it is possible to improve the effective signal-to-interference-plus-noise power ratio of the second radio system and to increase throughput. Moreover, since the influence of interfering waves arriving from the first radio system can be reduced, it is possible to enlarge the coverage of the second radio system in the shared frequency band. Note that a description of the second exemplary embodiment has been given by taking the OFDM-based radio reception device as an example, but the present invention can also be applied to other transmission schemes, namely, for example, DFT-Spread OFDM.

3. Third Exemplary Embodiment

Figure 1:
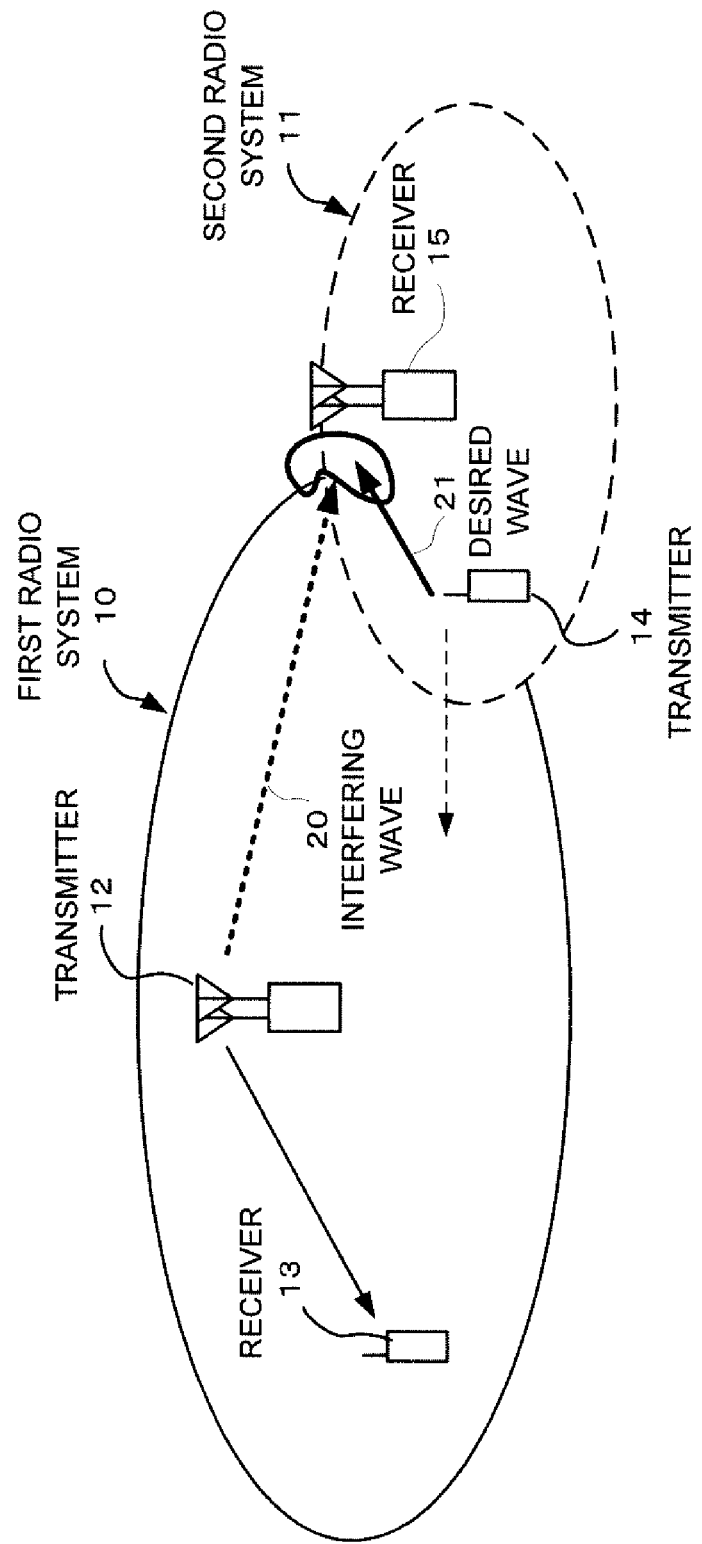
FIG. 1 is a schematic diagram of general communication systems to describe dynamic spectrum access.

The above-described exemplary embodiments illustrate radio reception devices in the first radio system 10 and the second radio system 11 shown in FIG. 1 as examples. However, the present invention is also applicable even if a plurality of radio systems of different types exist and a plurality of radio systems of the same type also exist. Hereinafter, a description will be given of a case, as a third exemplary embodiment of the present invention, where two radio systems of the same type (first and second radio systems) and two radio systems of different types (third and fourth radio systems) exist, and where a radio reception device according to the present exemplary embodiment belongs to the second radio system.

Figure 11:
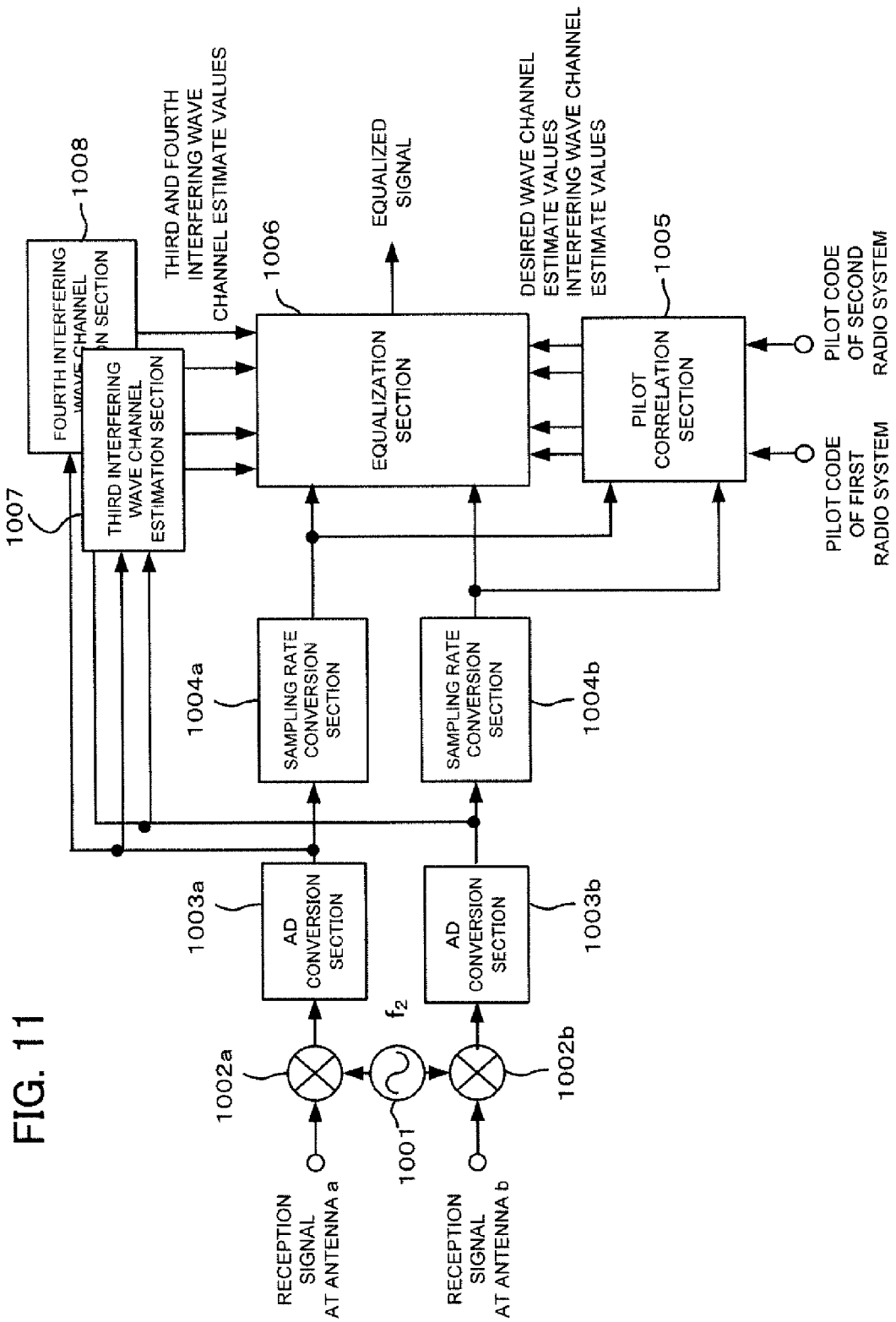
FIG. 11 is a block diagram showing a functional configuration of a radio reception device according to a third exemplary embodiment of the present invention.

Referring to FIG. 11, the radio reception device according to the present exemplary embodiment includes a frequency oscillator 1001, frequency conversion sections 1002a and 1002b, AD conversion sections 1003a and 1003b, sampling rate conversion sections 1004a and 1004b, a pilot correlation section 1005, an equalization section 1006, a third interfering wave channel estimation section 1007, and a fourth interfering wave channel estimation section 1008.

The frequency oscillator 1001 generates a frequency signal whose frequency is the center frequency $f_2$ of reception signals of the second radio system and outputs it to each of the frequency conversion sections 1002a and 1002b. The frequency conversion sections 1002a and 1002b multiply RF reception signals, which are received through antennas a and b, respectively, by the frequency signal of the frequency $f_2$, thereby convert them into baseband reception signals, and output these baseband reception signals to the AD conversion sections 1003a and 1003b, respectively. The baseband signals are converted into digital signals by the AD conversion sections 1003a and 1003b and output to the sampling rate conversion sections 1004a and 1004b, respectively.

The sampling rate conversion sections 1004a and 1004b convert the sampling rate of the digital signals into a predetermined sampling rate suitable for demodulation and output the signals of the converted predetermined sampling rate to the pilot correlation section 1005 and the equalization section 1006.

The pilot correlation section 1005 performs correlation processing of the reception signals of the converted sampling rate with each of a first radio system pilot code and a second radio system pilot code to obtain the channel estimate values of desired waves from a transmitter of the second radio system and the channel estimate values of interfering waves from a transmitter of the first radio system, and outputs the desired wave channel estimate values and the interfering wave channel estimate values to the equalization section 1006.

The third interfering wave channel estimation section 1007 generates the channel estimate values of third interfering waves from a transmitter of the third radio system, which has different parameters from those of the second radio system, while the fourth interfering wave channel estimation section 1008 generates the channel estimate values of fourth interfering waves from a transmitter of the fourth radio system, which has different parameters from those of the second radio system. The third interfering wave channel estimation section 1007 and the fourth interfering wave channel estimation section 1008 have basically the same configurations as the interfering wave channel estimation section 120 shown in FIG. 2 except that demodulation parameters are different, and therefore a detailed description thereof will be omitted.

The equalization section 1006 receives as input the desired wave channel estimate values and the interfering wave channel estimate values from the pilot correlation section 1005 as well as the third and fourth interfering wave channel estimate values from the third interfering wave channel estimation section 1007 and the fourth interfering wave channel estimation section 1008, respectively, to generate an equalization weight. The equalization section 1006 uses the equalization weight to perform equalization processing of the reception signals input from the sampling rate conversion sections 1004a and 1004b, and thus outputs an equalized signal.

As described above, even if there are interfering waves from radio systems of the same type and/or radio systems of different types, the radio reception device according to the present exemplary embodiment can obtain the channel estimate values of such interfering waves and the channel estimate values of desired waves and generate an equalization weight that minimizes the square error between a pilot code and an equalized signal. Thus, it is possible to obtain the effect of effectively suppressing interference from other radio systems.

4. Others

The foregoing exemplary embodiments have been described by taking a case as an example where two receive antennas are provided in the second radio system. However, the present invention can also be applied to a radio reception device with two or more receive antennas. Moreover, a description has been given by taking radio reception devices in the case of SIMO (Single Input Multiple Output) in the second radio system. However, the present invention can also be applied to a radio reception device in the case of MIMO (Multiple Input Multiple Output) in the second radio system.

Furthermore, the foregoing exemplary embodiments have been described assuming that the first radio system is an interfering system. However, the reception device of the present invention can also be applied to the first radio system.

Note that the foregoing exemplary embodiments can be implemented by preconfigured hardware, namely, for example, a circuit, or can also be implemented by software so as to operate by being controlled by a computer circuit (for example, CPU, not shown) based on control programs. In this case, such control programs are stored on a recording medium (for example, ROM (Read Only Memory), hard disk, or the like) within the radio reception device or the baseband section, or on an external recording medium (for example, removable medium, removable disk, or the like), and read and executed by the computer circuit.

INDUSTRIAL APPLICABILITY

The present invention is suitably applicable to devices, methods, and programs that need to receive radio signals by frequency sharing.

REFERENCE SIGNS LIST

10 First radio system service area
11 Second radio system service area
12 Transmitter of the first radio system
13 Receiver of the first radio system
14 Transmitter of the second radio system
15 Receiver of the second radio system
100 Demodulation section
101 Frequency oscillator
102a, 102b Frequency conversion sections
103a, 103b AD conversion sections
104a, 104b Sampling rate conversion sections
105 Equalization section
110 Desired wave channel estimation section
111 Pilot correlation section
120 Interfering wave channel estimation section
121a, 121b Sampling rate conversion sections
122 Frequency oscillator
123a, 123b Frequency conversion sections
124 Pilot correlation section
125 Channel estimate value conversion section
201 Frequency oscillator
202a, 202b Frequency conversion sections
203 Filter section
204 Sampling rate conversion section
205 Path timing adjustment section
501 First radio system reception signal
502 Second radio system reception signal
503 First radio system channel estimate values
800 Demodulation section
801 Frequency oscillator
802a, 802b Frequency conversion sections
803a, 803b AD conversion sections
804a, 804b Sampling rate conversion sections
805a, 805b Fourier transform sections
806 Equalization section
810 Desired wave channel estimation section
811 Pilot correlation section
820 Interfering wave channel estimation section
821a, 821b Sampling rate conversion sections
822 Frequency oscillator
823a, 823b Frequency conversion sections
824a, 824b Fourier transform sections
825 Pilot correlation section
816 Channel estimate value conversion section
911 Frequency conversion section
912 Filter section
913 Subcarrier interval conversion section
914 Cyclic delay shift section
1001 Frequency oscillator
1002a, 1002b Frequency conversion sections
1003a, 1003b AD conversion sections
1004a, 1004b Sampling rate conversion sections
1005 Pilot correlation section
1006 Equalization section
1007 Third interfering wave channel estimation section
1008 Fourth interfering wave channel estimation section

The invention claimed is:

1. A radio reception device that uses a frequency band assigned to a first radio system in a second radio system, comprising:
　a memory storing instructions; and
　a processor configured to execute the instructions to:
　　generate, based on reception signals, first channel estimate values of interfering wave components arriving from the first radio system, wherein the first radio system employs a different communication scheme from that of the second radio system, the generating the first channel estimate values including:
　　　generating channel estimate values in accordance with the communication scheme of the first radio system; and
　　　converting the channel estimate values into channel estimate values in conformity with the communication scheme of the second radio system, thereby generating the first channel estimate values;
　　generate, based on the reception signals, second channel estimate values of desired wave components received through the communication scheme of the second radio system; and
　　suppress the interfering wave components by using the first and second channel estimate values.

2. The radio reception device according to claim 1, wherein the processor is further configured to execute the instructions to:
　frequency-convert placed frequencies of the channel estimate values in accordance with the communication scheme of the second radio system;
　cut out the frequency-converted channel estimate values within a demodulation band that is the same as in the communication scheme of the second radio system;
　convert a sampling rate of the cut-out channel estimate values into a sampling rate that is the same as in the communication scheme of the second radio system; and
　time-adjust the sampling rate-converted channel estimate values in accordance with path timings of propagation paths in the first and second radio systems.

3. The radio reception device according to claim 1, wherein processing in each of the steps of generating the first channel estimate values, generating the second channel estimate values, and suppressing interference is performed in frequency domain.

4. The radio reception device according to claim 1, wherein the first and second radio systems have different communication parameters in at least one of system center frequency, sampling rate, or system bandwidth.

5. A radio receiving method for a radio reception device comprising a frequency oscillator and being capable of using a frequency band assigned to a first radio system in a second radio system, the method comprising:
　generating, via the radio reception device, based on reception signals, first channel estimate values of interfering wave components arriving from the first radio system, wherein the first radio system employs a different communication scheme from that of the second radio system, the generating the first channel estimate values including:

generating channel estimate values in accordance with the communication scheme of the first radio system; and converting the channel estimate values into channel estimate values in conformity with the communication scheme of the second radio system, thereby generating the first channel estimate values;

generating, via the radio reception device, based on the reception signals, second channel estimate values of desired wave components received through the communication scheme of the second radio system; and suppressing, via the radio reception device, the interfering wave components by using the first and second channel estimate values.

6. The radio receiving method according to claim 5, wherein the step of converting the channel estimate values comprises:

frequency-converting placed frequencies of the channel estimate values in accordance with the communication scheme of the second radio system;

cutting out the frequency-converted channel estimate values within a demodulation band that is the same as in the communication scheme of the second radio system;

converting a sampling rate of the cut-out channel estimate values into a sampling rate that is the same as in the communication scheme of the second radio system; and time-adjusting the sampling rate-converted channel estimate values in accordance with path timings of propagation paths in the first and second radio systems.

7. The radio receiving method according to claim 5, wherein processing in each of the steps of generating the first channel estimate values, generating the second channel estimate values, and suppressing interference is performed in frequency domain.

8. The radio receiving method according to claim 5, wherein the first and second radio systems have different communication parameters in at least one of system center frequency, sampling rate, or system bandwidth.

9. A mobile station comprising the radio reception device according to claim 1.

10. A system comprising:

a first radio system having a frequency band assigned thereto; and a second radio system in which a radio communication device is operable, wherein the radio communication device can use the frequency band assigned to the first radio system in the second radio system, wherein the first radio system employs a different communication scheme from that of the second radio system, wherein the radio communication device comprises a memory storing instructions and a processor configured to execute the instructions to:

generate, based on reception signals, first channel estimate values of interfering wave components arriving from the first radio system, and second channel estimate values of desired wave components received through the communication scheme of the second radio system, and suppresses the interfering wave components by using the first and second channel estimate values, the generating the first channel estimate values including:

generating channel estimate values in accordance with the communication scheme of the first radio system; and converting the channel estimate values into channel estimate values in conformity with the communication scheme of the second radio system, thereby generating the first channel estimate values.

11. The system according to claim 10, wherein the processor is further configured to execute the instructions to:

generate, based on the reception signals, second channel estimate values of desired wave components received through the communication scheme of the second radio system; and suppress, the interfering wave components by using the first and second channel estimate values.

12. The system according to claim 10, wherein the processor is further configured to execute the instructions to frequency-convert placed frequencies of the channel estimate values in accordance with the communication scheme of the second radio system;

cut out the frequency-converted channel estimate values within a demodulation band that is the same as in the communication scheme of the second radio system;

convert a sampling rate of the cut-out channel estimate values into a sampling rate that is the same as in the communication scheme of the second radio system; and time-adjust the sampling rate-converted channel estimate values in accordance with path timings of propagation paths in the first and second radio systems.

13. The system according to claim 11, wherein processing in each of the steps of generating the first channel estimate values, generating the second channel estimate values, and suppressing interference is performed in frequency domain.

14. The system according to claim 11, wherein the first and second radio systems have different communication parameters in at least one of system center frequency, sampling rate, or system bandwidth.

15. A non-transitory computer-readable storage medium storing a set of computer-readable instructions that, when executed by a processor, causes the processor to perform a method, the method comprising:

generating, based on reception signals, first channel estimate values of interfering wave components arriving from the first radio system, wherein the first radio system employs a different communication scheme from that of the second radio system, the generating the first channel estimate values including:

generating, based on the reception signals, channel estimate values in accordance with the communication scheme of the first radio system; and converting the channel estimate values into channel estimate values in conformity with the communication scheme of the second radio system, thereby generating the first channel estimate values;

generating, based on the reception signals, second channel estimate values of desired wave components received through the communication scheme of the second radio system; and suppressing, the interfering wave components by using the first and second channel estimate values.

\* \* \* \* \*